US011748567B2

(12) United States Patent
Li et al.

(10) Patent No.: US 11,748,567 B2
(45) Date of Patent: Sep. 5, 2023

(54) TOTAL CORRELATION VARIATIONAL AUTOENCODER STRENGTHENED WITH ATTENTIONS FOR SEGMENTING SYNTAX AND SEMANTICS

(71) Applicant: Baidu USA, LLC, Sunnyvale, CA (US)

(72) Inventors: Dingcheng Li, Sammamish, WA (US); Shaogang Ren, Redmond, WA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 28 days.

(21) Appl. No.: 16/926,525

(22) Filed: Jul. 10, 2020

(65) Prior Publication Data
US 2022/0012425 A1    Jan. 13, 2022

(51) Int. Cl.
| | |
|---|---|
| *G06F 40/10* | (2020.01) |
| *G06F 40/284* | (2020.01) |
| *G06F 40/211* | (2020.01) |
| *G06F 40/30* | (2020.01) |
| *G06N 3/08* | (2023.01) |

(52) U.S. Cl.
CPC .......... *G06F 40/284* (2020.01); *G06F 40/211* (2020.01); *G06F 40/30* (2020.01); *G06N 3/08* (2013.01)

(58) Field of Classification Search
CPC ........ G06F 40/10; G06F 40/12; G06F 40/131; G06F 40/137; G06F 40/20; G06F 40/205; G06F 40/211; G06F 40/232; G06F 40/258; G06F 40/274; G06F 40/279; G06F 40/284; G06F 40/30

USPC .............................................. 704/9, 1, 4, 10
See application file for complete search history.

(56) References Cited

U.S. PATENT DOCUMENTS

| | | |
|---|---|---|
| 5,740,443 A | 4/1998 | Carini |
| 7,584,452 B1 | 9/2009 | Johnson |
| 11,042,796 B2 * | 6/2021 | Hashimoto .......... G06N 3/0445 |
| (Continued) | | |

FOREIGN PATENT DOCUMENTS

| | | | | |
|---|---|---|---|---|
| CN | 108733682 A | * | 11/2018 | ............. G06F 17/30 |
| CN | 110688861 A | * | 1/2020 | ............. G06F 40/51 |
| (Continued) | | | | |

OTHER PUBLICATIONS

Mishra et al., "A Simple Neural Attentive Meta-Learner," arXiv preprint arXiv:1707.03141, 2018. (17pgs).

(Continued)

*Primary Examiner* — Qi Han
(74) *Attorney, Agent, or Firm* — NORTH WEBER & BAUGH LLP (57) ABSTRACT

Described herein are embodiments of a framework named as total correlation variational autoencoder (TC_VAE) to disentangle syntax and semantics by making use of total correlation penalties of KL divergences. One or more Kullback-Leibler (KL) divergence terms in a loss for a variational autoencoder are discomposed so that generated hidden variables may be separated. Embodiments of the TC_VAE framework were examined on semantic similarity tasks and syntactic similarity tasks. Experimental results show that better disentanglement between syntactic and semantic representations have been achieved compared with state-of-the-art (SOTA) results on the same data sets in similar settings.

20 Claims, 5 Drawing Sheets

(56) References Cited

U.S. PATENT DOCUMENTS

| | | | | |
|---|---|---|---|---|
| 2015/0066496 | A1* | 3/2015 | Deoras | G06N 3/0472 |
| | | | | 704/232 |
| 2018/0329884 | A1 | 11/2018 | Xiong | |
| 2020/0073879 | A1 | 3/2020 | Grabau | |
| 2020/0372225 | A1* | 11/2020 | Xu | G06N 3/0454 |
| 2021/0027770 | A1 | 1/2021 | Olabiyi | |
| 2021/0133535 | A1 | 5/2021 | Zhao | |
| 2021/0174784 | A1 | 6/2021 | Min | |
| 2021/0216862 | A1* | 7/2021 | Liu | G06K 9/6289 |
| 2021/0240453 | A1 | 8/2021 | Badlani | |
| 2021/0264109 | A1 | 8/2021 | Srinivasan | |
| 2022/0012633 | A1 | 1/2022 | Molahalli | |

FOREIGN PATENT DOCUMENTS

| | | | | |
|---|---|---|---|---|
| CN | 111178094 | A * | 5/2020 | G60F 40/58 |
| WO | WO-2020048195 | A1 * | 3/2020 | G06F 40/30 |

OTHER PUBLICATIONS

J. Mitchell, "Decomposing bilexical dependencies into semantic and syntactic vectors," In Proceedings of the 1st Workshop on Representation Learning for NLP, 2016. (10pgs).

Mitchell et al.,"Orthogonality of Syntax and Semantics within Distributional Spaces," In Proceedings of the 53rd ACL and the 7th IJNLP, 2015. (10pgs).

Peters et al.,"Deep contextualized word representations," arXiv preprint arXiv:1802.05365, 2018. (15pgs).

Tenenbaum et al.,"Separating style and content with bilinear models," in Neural Computation, 2000. (37pgs).

R. D. Van Valin Jr,"Exploring the Syntax-Semantics Interface," Cambridge University Press, 2005. (4pgs).

Blei et al.,"Latent dirichlet allocation," Journal of Machine Learning , Research 3, 2003. (30pgs).

Burgess et al.,"MONet:Unsupervised scene decomposition and representation," arXiv preprint arXiv:1901.11390, 2019. (22pgs).

Chen et al.,"A multi-task approach for disentangling syntax and semantics in sentence representations," arXiv preprint arXiv:1904.01173, 2019. (13pgs).

Chen et al.,"InfoGAN:Interpretable representation learning by information maximizing generative adversarial nets," arXiv preprint arXiv:1606.03657, 2016. (14pgs).

Conneau et al.,"Supervised learning of universal sentence representations from natural language inference data," arXiv preprint arXiv:1705.02364, 2018. (12pgs).

Devlin et al.,"BERT: Pre-training of deep bidirectional transformers for language understanding," arXiv preprint arXiv:1810.04805, 2019. (16 pgs).

Shen et al.,"Deep Active Learning for Named Entity Recognition," arXiv preprint arXiv: 1707.05928, 2018. (15pgs).

Tenenbaum et al.,"Separating Style and Content with Bilinear Models," [online], [Retrieved Apr. 30, 2021]. Retrieved from Internet <URL: https://doi.org/10.1162/089976600300015349> 2000. (37pgs).

Zhao et al.,"Adversarially Regularized Autoencoders," arXiv preprint arXiv:1706.04223, 2018. (16pgs).

Esmaeili et al.,"Structured Disentangled Representations," In The 22nd International Conference on Artificial Intelligence and Statistics, 2019.(10pgs).

Fu et al.,"Style transfer in text:Exploration and evaluation," In Thirty-Second AAAI Conference on Artificial Intelligence, 2018. (8pgs).

Higgins et al.,"β-VAE:Learning basic visual concepts with a constrained variational framework," In 5th International Conference on Learning Representations, 2017. (22pgs).

Hu et al.,"Toward controlled generation of text," arXiv preprint arXiv:1703.00955, 2018. (10pgs).

Iyyer et al.,"Adversarial example generation with syntactically controlled paraphrase networks," arXiv preprint arXiv:804.06059, 2018. (11pgs).

Kim et al.,"Disentangling by factorising," arXiv preprint arXiv:1802.05983, 2019. (19pgs).

Kingma et al.,"Autoencoding variational bayes," arXiv preprint arXiv:1312.6114, 2014. (14pgs).

Kiros et al.,"Skip-thought vectors," arXiv preprint arXiv:1506.06726, 2015. (11pgs).

Makhzani et al.,"PixelGAN Autoencoders," arXiv preprint arXiv:1706.00531, 2017. (16pgs).

Miao et al.,"Neural variational inference for text processing," arXiv preprint arXiv:1511.06038, 2016. (12pgs).

Chen et al.,"Variational Sequential Labelers for Semi-Supervised Learning," arXiv preprint arXiv:1906.09535, 2019. (12pgs).

Qi Chen et al.,"Isolating Sources of Disentanglement in Variational Autoencoders,"[online], [Retrieved Apr. 30, 2021]. Retrieved from Internet <URL: https://openreview.net/forum?id=BJdMRoCIf>, In 6th International Conference on Learning Representations, ICLR 2018, Workshop Track Proceedings, 2018. (18pgs).

Esmaeili et al.,"Structured Disentangled Representations," arXiv preprint arXiv: 1804.02086v, 2018. (17pgs).

Fu et al.,"Style Transfer in Text: Exploration and Evaluation," arXiv preprint arXiv: 1711.06861, 2017. (9pgs).

Iyyer et al.,"Adversarial Example Generation with Syntactically Controlled Paraphrase Networks," arXiv preprint arXiv:1804.06059, 2018. (11pgs).

Makhzani et al.,"Adversarial Autoencoders," arXiv preprint arXiv: 1511.05644, 2016. (16pgs).

Mathieu et al.,"Disentangling factors of variation in deep representation using adversarial training," arXiv preprint arXiv: 1611.03383, 2016. (12pgs).

Wiseman et al.,"Learning Neural Templates for Text Generation," arXiv preprint arXiv:1808.10122, 2019. (14pgs).

Yin et al.,"Deep reinforcement learning for Chinese zero pronoun resolution," In Proceedings of the 56th ACL, 2018. (10pgs).

Zhou et al.,"Multi-space Variational Encoder-Decoders for Semi-supervised Labeled Sequence Transduction," arXiv preprint arXiv:1704.01691, 2017. (11pgs).

Non-Final Office Action dated Dec. 22, 2022 in the related matter U.S. Appl. No. 16/985,904 (19pgs).

Chen et al., "Controllable paraphrase generation with a syntactic exemplar," arXiv preprint arXiv: 1906.00565, 2019. (13 pgs).

Yinghao Li, "Syntactically guided text generation," School of Electrical & Computer Engineering, Georgia Institute of Technology, May 2020. (54 pgs).

Zhang et al., "Interactive multi-head attention networks for aspect-level sentiment classification," In EEE Access, vol. 7, 160017-160028, 2019. (12 pgs).

Final Office Action dated May 23, 2023, in the related matter U.S. Appl. No. 16/985,904. (20pgs).

Response filed Mar. 20, 2023, in the related matter U.S. Appl. No. 16/985,904. (18pgs).

Balasubramanian et al., "Polarized-VAE: Proximity Based Disentangled Representation Learning for Text Generation," arXiv preprint arXiv: 2004.10809v1, Apr. 2020. (8pgs).

Bao et al.,"Generating Sentences from Disentangled Syntactic and Semantic Spaces," arXiv preprint arXiv: 1907.05789v1, 2019. (11pgs).

L. Fang,"Towards Effective and Controllable Neural Text Generation," A dissertation submitted to the faculty of the Graduate School of the University at Buffalo, The State University of New York, 2020. (88pgs).

Liu et al.,"A Transformer-Based Variational Autoencoder for Sentence Generation," 2019 International Joint Conference on Neural Networks (IJCNN), 2019.(7pgs).

Wu et al.,"Mask and Infill: Applying Masked Language Model to Sentiment Transfer," arXiv preprint arXiv: 1908.08039v1, 2019. (7pgs).

Zheng et al.,"Disentangling Latent Space for VAE by Label Relevant/Irrelevant Dimensions," In Proceedings of the IEEE/CVF Conference on Computer Vision and Pattern Recognition, 2019. (10pgs).

(56) References Cited

OTHER PUBLICATIONS

Brunner et al.,"Disentangling the Latent Space of (Variational) Autoencoders for NLP," Advances in Computational Intelligence Systems: Contributions Presented at the 18th UK Workshop on Computational Intelligence, 2019. (6pgs).

Zhang et al.,"Syntax-Infused Variational Autoencoder for Text Generation," arXiv preprint arXiv:1906.02181v1, 2019. (10pgs).

\* cited by examiner

FIG. 4

TOTAL CORRELATION VARIATIONAL AUTOENCODER STRENGTHENED WITH ATTENTIONS FOR SEGMENTING SYNTAX AND SEMANTICS

BACKGROUND

A. Technical Field

The present disclosure relates generally to systems and methods for computer learning that can provide improved computer performance, features, and uses. More particularly, the present disclosure relates to systems and methods for segmenting syntax and semantics using variational autoencoder.

B. Background

Deep neural networks have achieved great successes in many domains, such as computer vision, natural language processing, recommender systems, etc.

There is a growing amount of work on learning interpretable or disentangled latent representations in machine learning, computer vision, as well as natural language processing (NLP). Disentanglement is essentially a task to separate latent factors of variation in the data and further learn interpretable semantic information. Factorial representations, those with statistically independent variables, obtained usually in unsupervised or semi-supervised fashions, distill information into a compact form, which is semantically meaningful and useful for diverse applications. In NLP, disentanglement has been used to separate representation of attributes such as sentiment from contents, understanding subtleties in topic modeling, and learning sentence representations that split the syntax and the semantics of a sentence. They are also used for better control of text generation, calculating semantics, or syntactic similarity between sentences.

A deep generative model has been proposed to segment syntax from semantics. The deep generative model uses von Mises Fisher (vMF) and Gaussian priors on semantic and syntactic latent variables respectively, and comprises a deep bag-of-words (BOW) decoder that conditions on these latent variables. The deep generative model focused on segmentation of syntax and semantics from hidden variables with a generative approach. However, such an approach lacks fine-grained decomposition and thus may fail to segment syntax from semantics in a subtle way.

Accordingly, what is needed are systems and methods for segmenting syntax and semantics for improved performance.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of segmenting syntax and semantics, aspects of the present disclosure are not so limited. Accordingly, the aspects of the present disclosure may be applied or adapted for separation of objects and entity attributes in other contexts.

A. GENERAL INTRODUCTION

There is a growing amount of work on learning interpretable or disentangled latent representations in machine learning, computer vision, as well as natural language processing (NLP). Disentanglement is essentially a task to separate latent factors of variation in the data and further learn interpretable semantic information. Factorial representations, those with statistically independent variables, obtained usually in unsupervised or semi-supervised fashions, distill information into a compact form, which is semantically meaningful and useful for diverse applications. In NLP, disentanglement has been used to separate representation of attributes such as sentiment from contents, understanding subtleties in topic modeling, and learning sentence representations that split the syntax and the semantics of a sentence. They are also used for better control of text generation, calculating semantics, or syntactic similarity between sentences.

A deep generative model has been proposed to segment syntax from semantics. The deep generative model used von Mises Fisher (vMF) and Gaussian priors on semantic and syntactic latent variables respectively. A deep bag-of-words (BOW) decoder, in the deep generative model, conditioned on these latent variables. The deep generative model focused on segmentation of syntax and semantics from hidden variables with a generative approach. However, such an approach lacks fine-grained decomposition and thus may fail to segment syntax from semantics in a more subtle way.

In order to make up this shortcoming, embodiments of a total correlation variational autoencoder are proposed to enable hidden variables to be more factoriable. Specifically, in one or more embodiments, total correlation is introduced into a variational autoencoder (VAE) as a penalty such that both deeper and meaningful factorization may be obtained.

In one or more embodiments, learned semantic representations are evaluated on Semantic Evaluation (SemEval) semantic textual similarity (STS) tasks. A syntactic structure of an unseen sentence is predicted to be the one similar to its nearest neighbor, which is determined by a latent syntactic representation in a large set of annotated sentences. Experiments demonstrate that comparable performances may be achieved when learned representations are mostly segmented.

B. EMBODIMENTS OF TC_VAE FRAMEWORK

It shall also be noted that although embodiments described herein may be within the context of segmenting syntactic information from semantic one within sentence representations, aspects of the present disclosure may be applied to various aspects, including any segmentation tasks in NLP.

1. Embodiments of Total Correlation VAE and Objective Function

One or more embodiments of a multi-task generative model, named as TC_VAE, are disclosed in the present disclosure. Parameters of the TC_VAE model may be learned involving a term of computing loglikelihood of input data given latent variables and one or more terms of computing Kullback-Leibler (KL) divergences between posterior variational probabilities of hidden variables, given input data and the prior probabilities of hidden variables.

In one or more embodiments, under the context of NLP tasks, the TC_VAE may be defined in more domain-relevant means. Given $x_1, \ldots, x_N$ be a sequence of N tokens (e.g., words), conditioned on a continuous latent variable z.

$$p_\theta(x_1, \ldots, x_N) = \int \prod_{n=1}^{N} p_\theta(x_n \mid z) p_\theta(z) dz \quad (1)$$

In one or more embodiments, model parameters may be learned using the variational lower-bound:

$$\mathcal{L}(\theta, \phi, x) \geq \frac{1}{N} \sum_{n=1}^{N} (\mathbb{E}_{q_\phi}[\log p_\theta(x_n \mid z)] - KL(q_\phi(z \mid x_n) \| p_\theta(z))) \quad (2)$$

Where $q_\phi(z|x_n)$ is the encoder parameterized by $\phi$, $p_\theta(z|x_n)$ is the true posterior. The distribution $p_\theta(z)$ is the prior model for z. Based on observations that different words or phrases in sentences may stand for different entities for different roles, either grammatically or semantically, and may potentially interact with each other, the generations of latent variables in a VAE may be guided to correspond to entities in sentences. In one or more embodiments, the latent variables may be designed as decomposable latent variables. In one or more embodiments, a reconstruction network may generate words or phrases sequentially.

Figure 1:
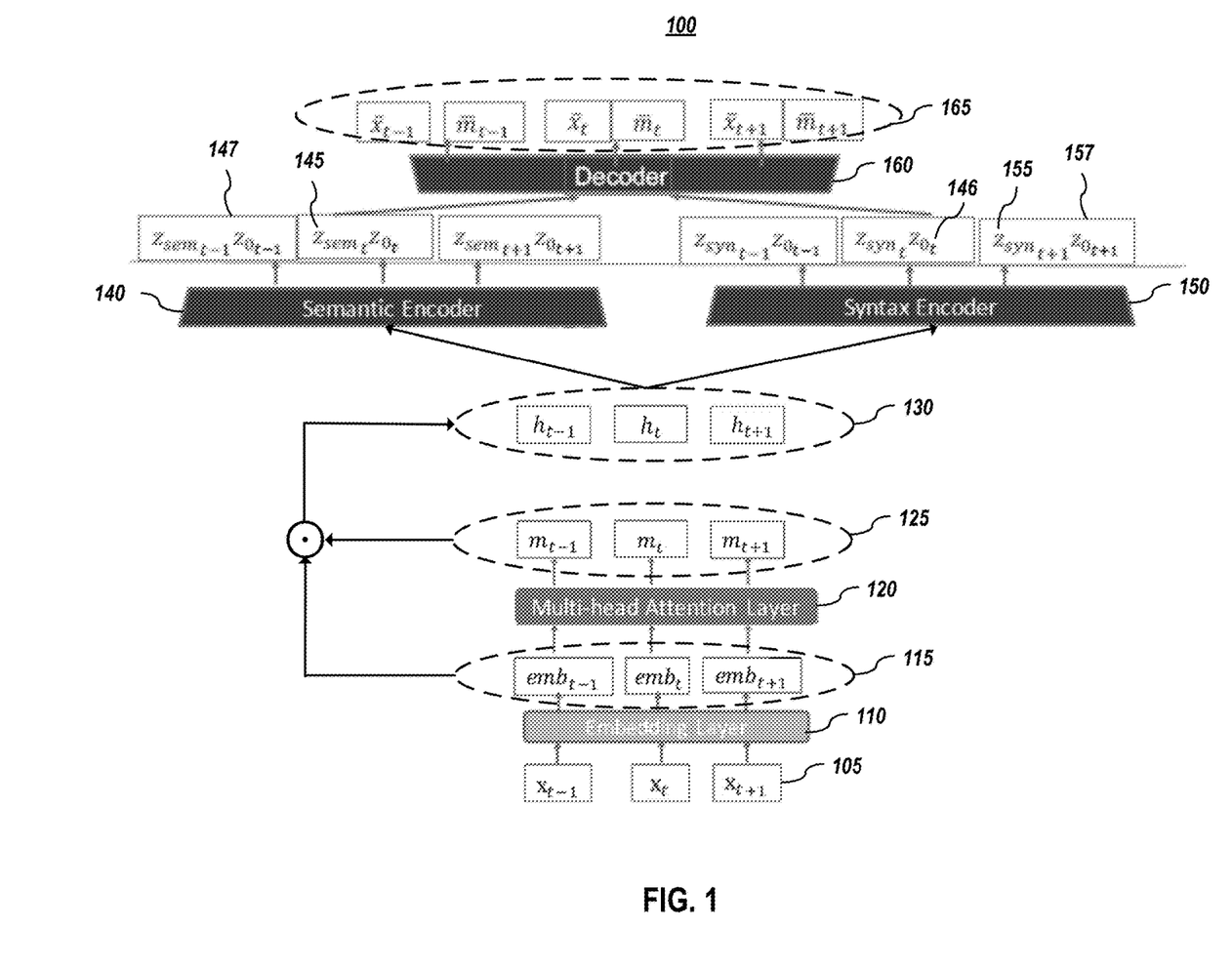
FIG. 1 depicts framework of a total correlation variational autoencoder (TC_VAE), according to embodiments of the present disclosure.

In one or more embodiments, the latent variable z may comprise more than one type of latent factors, e.g., the variables $z_{sem}$ and $z_{syn}$ as shown in FIG. 1. Accordingly, equation (2) may be written as:

$$\mathcal{L}(\theta, \phi, x) \geq \quad (3)$$
$$\frac{1}{N} \sum_{n=1}^{N} (\mathbb{E}_{q_\phi}[\log p_\theta(x_n | z^{syn}, z^{sem})] - KL(q_\phi(z^{syn} | x) \| p_\theta(z^{syn})) -$$
$$KL(q_\phi(z^{sem} | x) \| p_\theta(z^{sem})))$$

In one or more embodiments, one or more terms in equation (3) for calculating KL divergence may be further decomposed such that the disentanglement may reach a more fine grained level. In one or more embodiments, a global latent variable $z_0^{syn}$ and an attention network layer are added to the TC_VAE model.

In one or more embodiments, the second term in equation (3) may be expanded as:

$$KL(q_\phi(z^{syn} | x) \| p_\theta(z^{syn})) = \quad (4)$$
$$I_{q_\phi}(x, m_k; z_k^{syn}, z_0^{syn}) + \sum_{i,j} [KL(q(z_{ki}^{syn}, z_{0j}^{syn}) \| p(z_{ki}^{syn}, z_{0j}^{syn})) +$$
$$\beta KL(q_\phi(z_k^{syn}, z_0^{syn}) \| (\prod_i q_\phi(z_{ki}^{syn}) \prod_j q_\phi(z_{0j}^{syn})))]$$

Here k is an index for latent variables in the latent variable sequence; β is a coefficient. $I_{q_\phi}(x, m_k; z_k^{syn}, z_0^{syn})$ is the mutual information between $(x, m_k)$ and $(z_k^{syn}, z_0^{syn})$ under a joint distribution.

In one or more embodiments, the third term in equation (3) may be expanded as:

$$KL(q_\phi(z^{sem} | x) p_\theta(z^{sem})) = \quad (5)$$
$$I_{q_\phi}(x, m_k; z_k^{sem}, z_0^{sem}) + \sum_{i,j} [KL(q(z_{ki}^{sem}, z_{0j}^{sem}) \| p(z_{ki}^{sem}, z_{0j}^{sem})) +$$
$$\beta KL(q_\phi(z_k^{sem}, z_0^{sem}) \| (\prod_i q_\phi(z_{ki}^{sem}) \prod_j q_\phi(z_{0j}^{sem})))]$$

In one or more embodiments, at least one total correlation (TC) term is used as a penalty to enforce disentanglement of latent factors. In one or more embodiments, a weighted version is used for estimating the distribution value q(z). In one or more embodiments, the TC terms may comprise a mutual information term $I_{q_\phi}(x, m_k; z_k^{sem}, z_0^{sem})$, a first KL divergence $KL(q_\phi(z_k^{sem}, z_0^{sem}) \| (\prod_i q_\phi(z_{ki}^{sem}) \prod_j q_\phi(z_{0j}^{sem})))$ as shown in equation (4) and a second KL divergence $KL(q_\phi(z_k^{syn}, z_0^{syn}) \| (\prod_i q_\phi(z_{ki}^{syn}) \prod_j q_\phi(z_{0j}^{syn})))$ as shown in equation (5) respectively. The first KL divergence is a KL divergence between a distribution of the first sequence of combined latent variable $(z_k^{sem}, z_0^{sem})$ and a product of a factorial distribution $\prod_i q_\phi(z_{ki}^{sem})$ for each latent variable $z_{ki}^{sem}$ and a factorial distribution $\prod_j q_\phi(z_{0j}^{sem})$ for each latent variable $z_{0j}^{sem}$ in the first sequence of combined latent variables $(z_k^{sem}, z_0^{sem})$. Similarly, the second KL divergence is a KL divergence between a distribution of the second sequence of combined latent variable $(z_k^{syn}, z_0^{syn})$ and a product of a factorial distribution $\prod_i q_\phi(z_{ki}^{syn})$ for each latent variable $z_{ki}^{syn}$ and a factorial distribution $\prod_j q_\phi(z_{0j}^{syn})$ for each latent variable $z_0^{syn}$ in the second sequence of combined latent variables $(z_k^{syn}, z_0^{syn})$.

FIG. 1 depicts framework of a total correlation variational autoencoder (TC_VAE), according to embodiments of the present disclosure. The TC_VAE network 100 comprises an embedding layer 110, an encoder layer comprising a first encoder (e.g., a semantic encoder) 140 and a second encoder (e.g., a syntax encoder) 150, and a decoder 160. In addition, the TC_VAE network 100 also comprises a multi-head attention layer 120, which generates attentions 125 from the embeddings 115 of input tokens (e.g., words) 105 so that syntactic markers may be highlighted. The attentions 125 are concatenated with embeddings 115 to obtain hidden variables 130. Through the semantic encoder 140 and the syntax encoder 150, a first sequence of latent variables (e.g., $z_{sem}$) 145 and a second sequence of latent variables (e.g., $z_{syn}$) 155 are generated respectively. A sequence of global latent variables (e.g., $z_{0(k)}$) 146 is combined with the first sequence of latent variables and the second sequence of latent variables to generate, respectively, a first sequence of combined latent variables 147 and a second sequence of combined latent variables 157. In a decoder stage, reconstructed words and attention markers 165 are inferred by the decoder 160. In one or more embodiments, back propagation may be triggered for TC_VAE training until convergence. In one or more embodiments, the global latent variable $z_0$ is a special latent variable encoding overall properties of the generated sentences and correlations between different grammatical and semantic topics. In one or more embodiments, the sequence for the global latent variable $z_0$ may be obtained based on the first sequence of latent variables (e.g., $z_{sem}$) 145 and the second sequence of latent variables (e.g., $z_{syn}$) 155. In one or more embodiments, the global latent variable $z_0$ may be a concatenation of the latent variable $z_{sem}$ and the latent variable $z_{syn}$.

Figure 2:
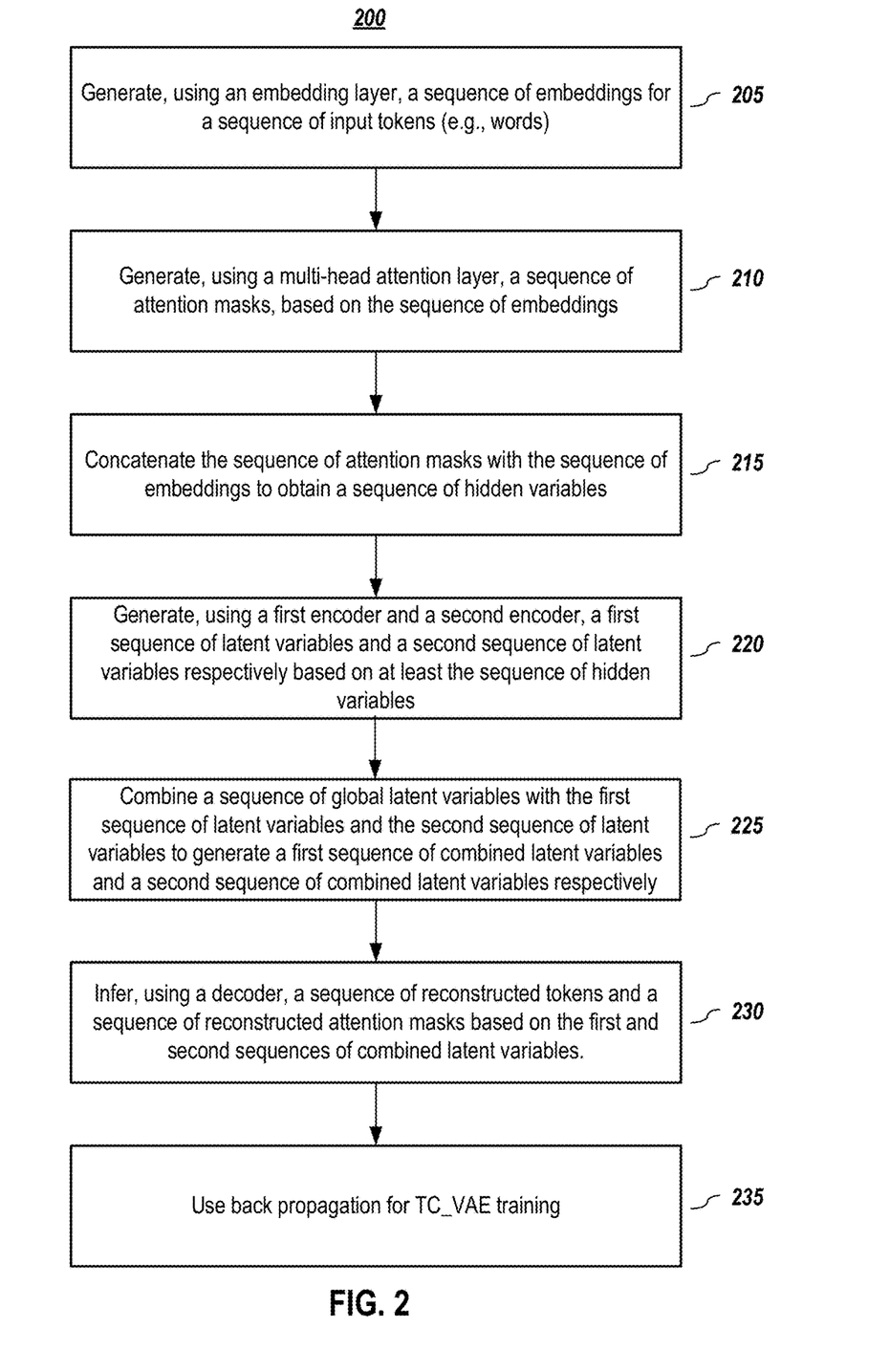
FIG. 2 depicts a process for words and attention markers reconstruction using the TC_VAE, according to embodiments of the present disclosure.

FIG. 2 depicts a process for words and attention markers reconstruction from segmented syntax and semantics latent variables using the TC_VAE, according to embodiments of the present disclosure. A sequence of embeddings is generated (205) using an embedding from a sequence of input tokens (e.g., words). A sequence of attention masks are generated (210) using the multi-head attention layer based on the sequence of embeddings. The sequence of attention masks is concatenated (215) with the sequence of embeddings to obtain a sequence of hidden variables. A first encoder (e.g., a semantic encoder) and a second encoder (e.g., a syntax encoder) are used to generate (220), respectively, a first sequence of latent variables (e.g., the variables $z_{sem}$) and a second sequence of latent variables (e.g., the variables $z_{syn}$), based on at least the sequence of hidden variables. A sequence of global latent variables is combined (225) with the first sequence of latent variables and the second sequence of latent variables to generate, respectively, a first sequence of combined latent variables and the second sequence of combined latent variables. A sequence of reconstructed tokens and a sequence of reconstructed attention masks are inferred (230), using a decoder, based on the first sequence of combined latent variables and the second sequence of combined latent variables. In one or more embodiments, back propagation is used (235) using the reconstructed tokens and attention masks may be used for TC_VAE training, until one or more training conditions (e.g., the model begins to converge) are met.

2. Embodiments for Training and Inference

In one or more embodiments, an element-wise multiplication with multi-way output between an embedding vector ($emb_t$) and its corresponding attention mask ($m_t$) is used to compute a hidden variable $h_t$. A sequence of the hidden variables is passed into both the semantic encoder and the syntax encoder to yield the latent variables. In one or more embodiments, the latent variables include $z_k$ and $z_{0(k)}$ due to the decomposition brought by a total correlation approach. In one or more embodiments, given an output of the decoder $(\bar{x}_k, \bar{m}_k)$, the loss for component k are given by the following equation:

$$\Psi_k(x, m_k; \theta, \phi, a, e, d) = -\mathbb{E}_{q_\phi^e(z_k, z_{0(k)}|x, m_k)}[m_k \log p_\theta^d(x|z_k, z_{0(k)})] + \quad (6)$$
$$KL(q_\phi^e(z_k, z_{0(k)}|x, m_k) \| p(z)) +$$
$$\gamma KL(q_\phi^e(m_k|x) \| p_\theta^d(m_k|z_k, z_{0(k)}))$$

Here a, e and d refer to parameters for the multi-head attention layer, encoder and decoder layer respectively; θ and φ are parameters for a likelihood and variational distribution respectively; the local latent variable $z_k$ comprises $z_k^{sem}$ and $z_k^{syn}$; the global latent variable $z_{0(k)}$ comprises $z_{0(k)}^{sem}$ and $z_{0(k)}^{syn}$; and γ is a nonnegative value.

In one or more embodiments, the loss for all components may be given as:

$$\mathcal{L}_{VAE}(x; a, e, d) = \sum_{k=1}^{K} \Psi_k(x, m_k; a, e, d) \quad (7)$$

In one or more embodiments, besides the above standard loss function, one or more additional loss functions may also be used. The additional loss functions may comprise a paraphrase reconstruction loss (PRL), a discriminative paraphrase loss (DPL), and a word position loss (WPL). In one or more embodiments, semantic variables may be swapped, the syntactic variables may be kept, and the sentences may be reconstructed accordingly. Furthermore, in one or more embodiments, the PRL may involve more variables, including a common latent factor $z_0$ and the focus mask variable $m_k$. Accordingly, the PRL may be defined as:

$$\mathbb{E}_{\substack{z_2^{sem} \sim q_\phi^e(1) \\ z_1^{syn} \sim q_\phi^e(2)}} [-\log p_\theta^d(x_1|z_2, z_{0(2)}^{sem}, z_1, z_{0(1)}^{syn})] + \quad (8)$$

$$\mathbb{E}_{\substack{z_1^{sem} \sim q_\phi^e(3) \\ z_1^{syn} \sim q_\phi^e(4)}} [-\log p_\theta^d(x_2|z_2^{syn}, z_1^{sem}, z_{0(1)}^{syn}, z_{0(2)}^{sem})]$$

Where $q_\phi^e(1) = q_\phi^e((z, z_0)^{sem}|x_2, m_2)$, $q_\phi^e(2) = q_\phi^e((z, z_0)^{syn}|x_1, m_1)$, $q_\phi^e(3) = q_\phi^e((z, z_0)^{sem}|x_1, m_1)$, and $q_\phi^e(4) = q_\phi^e((z, z_0)^{syn}|x_2, m_2)$.

In one or more embodiments, the DPL may be expressed as:

$$\max(0; \delta - \text{dist}(x_1, x_2) + \text{dist}(x_1; n_1)) + \max(0; \delta - \text{dist}(x_1, x_2) + \text{dist}(x_2; n_2)) \quad (9)$$

Here in expression (9), dist refers to the distance, $x_1$ and $x_1$ are sentences with paraphrase relationship while $x_1$ and $n_1$ are those without paraphrase relationship.

In one or more embodiments, the WPL may be expressed as:

$$\mathbb{E}_{z_{syn} \sim q_\phi(z|x)} \left[ \sum_i \log \text{softmax}(f([e_i; z_{syn}]))_i \right] \quad (10)$$

Here in expression (10), softmax(•)$_i$ indicates the probability of i.

C. EXPERIMENTAL RESULTS

In one or more experimental settings, a training set was formed by subsampling multiple paraphrase pairs. A separate dataset different from the training set was used as a development set. For semantic similarity evaluation, various other test sets were used.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Semantic Similarity

Table 1 focuses on semantic similarity evaluations with various approaches. Results from embodiments of the present disclosure are in rows related to decomposable VAE (DecVAE).

Specifically, the upper rows of Table 1 show how similarity may be modeled when trained on paraphrases. WORDAVG takes the average over the word embeddings in the input sequence to obtain the sentence representation. BLSTMAVG uses the average hidden states of a bidirectional LSTM as the sentence representation, where forward and backward hidden states are concatenated. These models use multiple dimensional word embeddings and multiple dimensional LSTM hidden vectors per direction. DPL only is used for training. As shown in the table 1, DecVAE WORDAVG achieves the best semantic score for STS avg metric and DecVAE BLSTTMAVG the best for STS bm (which stands for STS benchmark test set) metric. Nonetheless, those differences seem trivial for results for all VGVAE and DecVAE. Table 1 also includes semantic modeling results for several pretrained embeddings, all of which are far lower than those of VGVAE. This implies that embodiments of the VAE-based language modeling may capture semantics quite well no matter what variations were made.

In contrast, the lower half rows display remarkable differences between semantic and syntactic metrics. Essentially, these rows show whether semantic variables may better capture semantic information than syntactic variables. Table 1 includes some previous results for comparisons. Results from embodiments of the present disclosure are in the last two lines. As shown there, the semantic and syntactic variables of the base VGVAE model show similar performance on the STS test sets. With more losses being added, performance of these two variables gradually diverge, indicating that different information was captured in the two variables. Therefore, it may be seen that the various losses play important roles in the disentanglement of semantics and syntax in VGVAE. On the last line are the preliminary results of one embodiment of the present disclosure, DecVAE+LSTM. In this embodiment, a global latent variable $z_0$, a focus mask variable $m_k$, and the condition probability $p^d(x|z_k, z_{0(k)})$ obtained from the decoder were used in one or more experimental settings. Furthermore, the KL divergences of the total correlation and other ones were partially deployed.

Figure 3A:
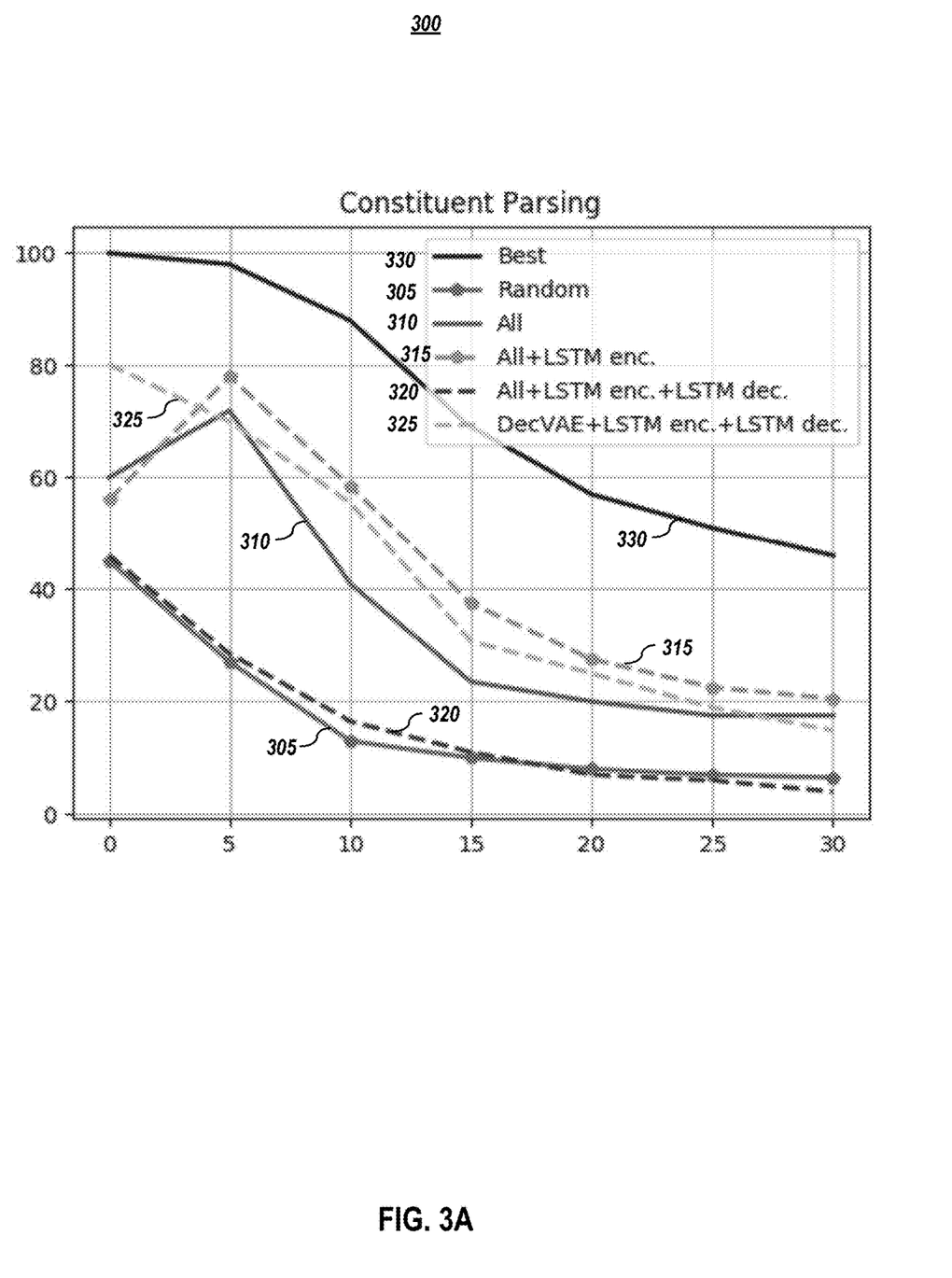
FIG. 3A graphically depicts constituency parsing F1 scores by sentence length for 1-nearest neighbor parsers based on semantic and syntactic variables, as well as a random baseline and an oracle nearest neighbor parser ("Best"), according to embodiments of the present disclosure.
Figure 3B:
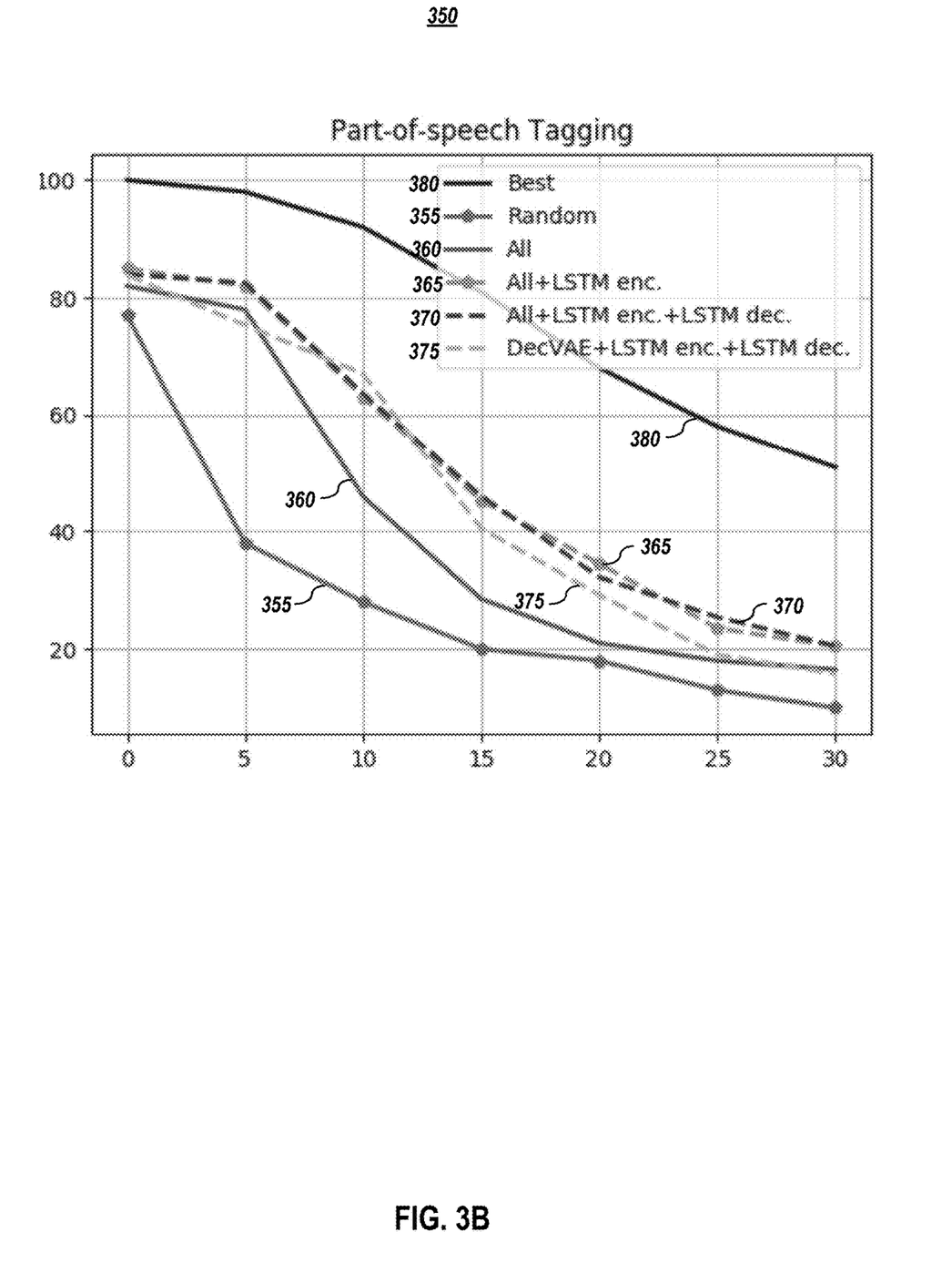
FIG. 3B graphically depicts part-of-speech tagging accuracy by sentence for 1-nearest neighbor parsers based on semantic and syntactic variables, as well as a random baseline and an oracle nearest neighbor parser ("Best"), according to embodiments of the present disclosure.

As seen from Table 1, competitive results were obtained. Embodiments of the present disclosure may disentangle semantics and syntax in a clear-cut line. Performance of embodiments of the present disclosure and baselines are plotted as the length of the target sentence increases as in FIG. 3A and FIG. 3B. FIG. 3A graphically depicts constituency parsing F1 scores by sentence length for various models, including a random baseline 305, "All" (e.g., the multi-task losses of VGVAE are used) 310, "All+LSTM enc." 315, "All+LSTM enc.+LSTM dec." 320, "DecVAE+LSTM enc.+LSTM dec." 325, and an oracle nearest neighbor parser ("Best") 330. Similarly, FIG. 3B graphically depicts part-of-speech tagging accuracy by sentence for various models, including a random baseline 355, "All" (e.g., the multi-task losses of VGVAE are used) 360, "All+LSTM enc." 365, "All+LSTM enc.+LSTM dec." 370, "DecVAE+LSTM enc.+LSTM dec." 375, and an oracle nearest neighbor parser ("Best") 380. Similar trend may be seen from both figures, i.e. the longer the sentence, the worse the performance. Embodiments of the present framework are close to the top and have more predictable trend.

2. Syntactic Similarity

Some proposed to use syntactic variables to calculate nearest neighbors for a 1-nearest-neighbor syntactic parser or part-of-speech (POS) tagger. Several metrics were employed to evaluate the quality of output parsers and tagging sequences. This evaluation does not aim at showing how good the parsing and/or the tagging can be. Instead, similar to the semantic similarity, it targets at showing syntactic variables may capture more syntactic information than semantic variables.

In one or more embodiments of the present disclosure, labeled F1 of constituent parsing and accuracy of POS tagging were reported. As shown in Table 2, two of the three rows of the upper part are results from VGVAE and the last row is results of DecVAE. Although only word average was tested, DecVAE outperforms VGVAE in both parsing and tagging. For the lower part, contrast to semantic similarity, syntactic variables are expected to boost both tasks while semantic variables to worsen them. VGVAE, as the baseline, both semantic and syntactic variables have similar accuracy for two tasks. With addition of diverse losses, expected performances appear. The last line is from DecVAE. The differences between both variables are largest compared with variations of VGVAE, which shows good disentanglement of syntax and semantics has been learned in DecVAE. Nonetheless, it seems that syntactic evaluation results in general are not so evident as the semantic correspondents.

TABLE 1

Pearson correlation (%) for STS test sets.

|  | semantic var. | | syntactic var. | |
| --- | --- | --- | --- | --- |
|  | bm | avg | bm | avg |
| GloVe | 39.0 | 48.7 | — | — |
| SkipThought | 42.0 | 42.0 | — | — |
| InferSent | 67.8 | 61.0 | — | — |
| ELMo | 57.7 | 60.3 | — | — |
| VGVAE WORD$_{AVG}$ | 71.9 | 64.8 | — | — |
| VGVAE BLSTTM$_{AVG}$ | 71.4 | 64.4 | — | — |
| DecVAE WORD$_{AVG}$ | 72.4 | 65.67 | — | — |
| DecVAE BLSTTM$_{AVG}$ | 70.6 | 62.39 | — | — |
| VGVAE | 45.5 | 42.7 | 40.8 | 43.2 |
| VGVAE + WPL | 51.5 | 49.3 | 28.1 | 31.0 |
| VGVAE + DPL | 68.4 | 58.2 | 37.8 | 40.5 |
| VGVAE + PRL | 67.9 | 57.8 | 29.6 | 32.7 |
| VGVAE + PRL + WPL | 69.8 | 61.3 | 23.2 | 27.9 |
| VGVAE + PRL + DPL | 71.2 | 64.2 | 31.7 | 33.9 |
| VGVAE + DPL + WPL | 71.0 | 63.5 | 24.1 | 29.0 |
| VGVAE ALL | 72.3 | 65.1 | 20.1 | 24.2 |
| VGVAE ALL + LSTM enc | 72.5 | 65.1 | 16.3 | 24.5 |
| VGVAE ALL + LSTM enc & dec. | 72.9 | 65.5 | 11.3 | 19.3 |
| DecVAE + WORD$_{AVG}$ enc | 73.91 | 64.04 | 22.34 | 17.72 |
| DecVAE + LSTM enc | 70.8 | 62.04 | 25.24 | 26.46 |

Data in table 1 and Table 2, except from results related to DecVAE, are from Mingda Chen, et al., *A Multi-Task Approach for Disentangling Syntax and Semantics in Sentence Representations*, in Proceedings of the 2019 Conference of the North American Chapter of the Association for Computational Linguistics: Human Language Technologies, NAACL-HLT 2019, Minneapolis, Minn., USA, Jun. 2-7, 2019, Volume 1 (Long and Short Papers), 2453-2464, which is incorporated by reference herein in its entirety.

In Table 1, "bm" stands for STS benchmark test set; "avg" stands for the average of Pearson correlation for each domain in the STS test sets from 2012 to 2016. Numbers are in bold if they are highest in the "semantic variable" columns or lowest in the "syntactic variable" columns. "ALL" indicates that all of the multi-task losses of VGVAE are used; and the last line (DecVAE+LSTM enc) shows results of model embodiments in the present disclosure.

TABLE 2

Syntactic similarity evaluations, labeled F1 score for constituent parsing, and accuracy (%) for part-of-speech tagging.

|  | Constituent Parsing (F$_1$, ↑) | | POS Tagging (% Acc., ↑) | |
| --- | --- | --- | --- | --- |
| VGVAE WORDAVG | 25.5 | | 21.4 | |
| VGVAE BLSTTMAVG | 25.7 | | 21.6 | |
| DecVAE WORDAVG | 27.87 | | 24.93 | |
|  | semV | synV | semV | synV |
| VGVAE | 25.2 | 25.0 | 21.1 | 21.0 |
| VGVAE + WPL | 24.1 | 28.2 | 20.3 | 24.2 |
| VGVAE + DPL | 25.1 | 26.1 | 21.3 | 21.8 |
| VGVAE + PRL | 24.7 | 26.9 | 21.0 | 22.2 |
| VGVAE + PRL + WPL | 25.1 | 28.8 | 21.5 | 24.6 |
| VGVAE + PRL + DPL | 25.0 | 26.2 | 21.1 | 22.1 |
| VGVAE + DPL + WPL | 24.4 | 28.1 | 20.6 | 23.6 |
| DecVAE + DPL + WPL | 24.9 | 27.90 | 20.41 | 24.93 |

In Table 2, numbers are in bold if they are worst in the "semantic variable" (shown in Table 2 as semV) columns or best in the "syntactic variable" (shown in Table 2 as synV) columns. Lines related to DecVAE show results of model embodiments in the present disclosure.

D. SOME CONCLUSIONS

In the present disclosure, syntax is segmented from semantics in one or more sentences with one or more embodiments of a total correlation variational autoencoder (TC_VAE). Experimental results show that embodiments of the TC_VAE may achieve comparable results in semantic similarity and syntax similarity to state-of-the-art (SOTA) results.

E. COMPUTING SYSTEM EMBODIMENTS

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 4:
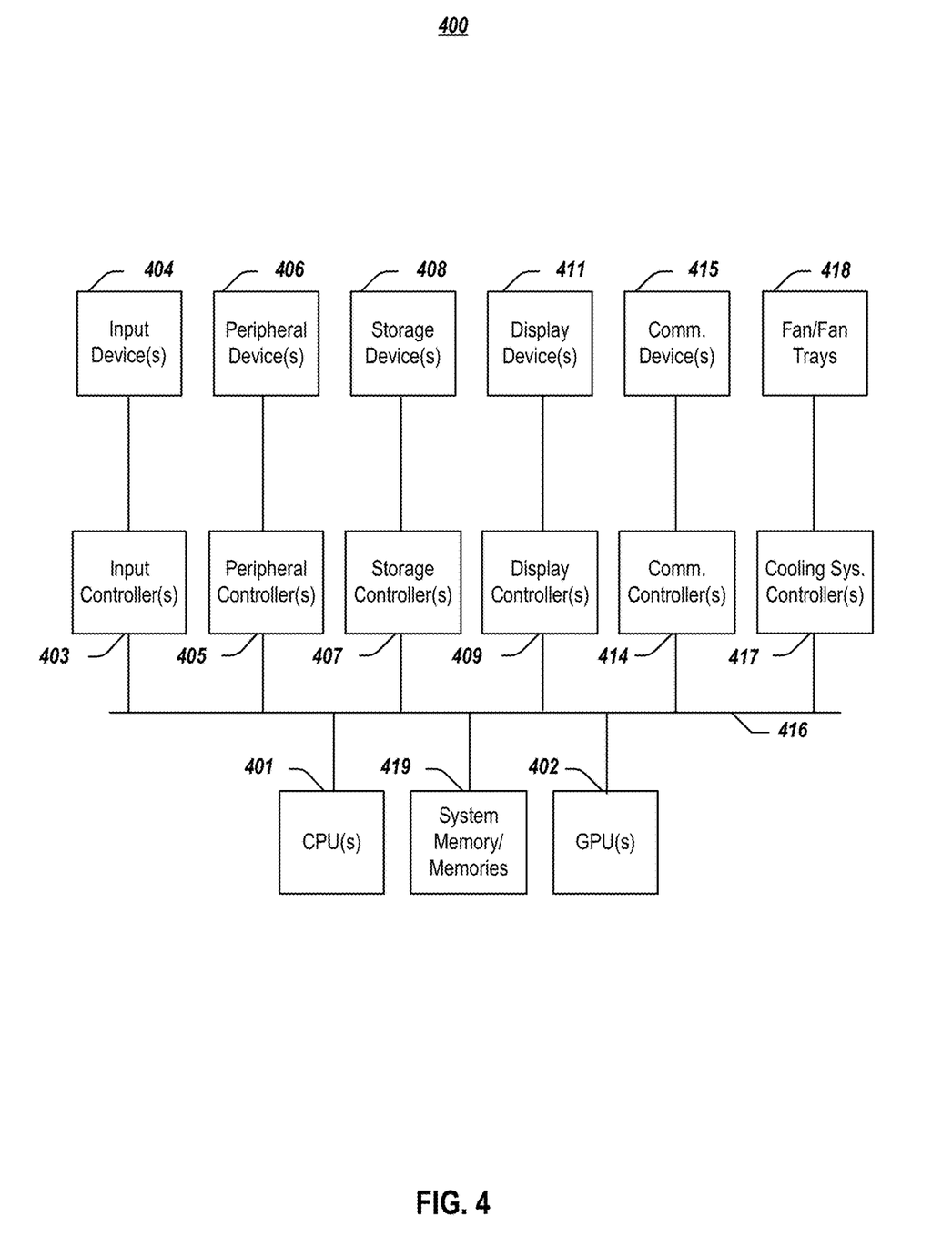
FIG. 4 depicts a simplified block diagram of a computing device/information handling system, according to embodiments of the present disclosure.

FIG. 4 depicts a simplified block diagram of an information handling system (or computing system), according to embodiments of the present disclosure. It will be understood that the functionalities shown for system 400 may operate to support various embodiments of a computing system—although it shall be understood that a computing system may be differently configured and include different components, including having fewer or more components as depicted in FIG. 4.

As illustrated in FIG. 4, the computing system 400 includes one or more central processing units (CPU) 401 that provides computing resources and controls the computer. CPU 401 may be implemented with a microprocessor or the like, and may also include one or more graphics processing units (GPU) 402 and/or a floating-point coprocessor for mathematical computations. In one or more embodiments, one or more GPUs 402 may be incorporated within the display controller 409, such as part of a graphics card or cards. Thy system 400 may also include a system memory 419, which may comprise RAM, ROM, or both.

A number of controllers and peripheral devices may also be provided, as shown in FIG. 4. An input controller 403 represents an interface to various input device(s) 404, such as a keyboard, mouse, touchscreen, and/or stylus. The computing system 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the present disclosure. Storage device(s) 408 may also be used to store processed data or data to be processed in accordance with the disclosure. The system 400 may also include a display controller 409 for providing an interface to a display device 411, which may be a cathode ray tube (CRT) display, a thin film transistor (TFT) display, organic light-emitting diode, electroluminescent panel, plasma panel, or any other type of display. The computing system 400 may also include one or more peripheral controllers or interfaces 405 for one or more peripherals 406. Examples of peripherals may include one or more printers, scanners, input devices, output devices, sensors, and the like. A communications controller 414 may interface with one or more communication devices 415, which enables the system 400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 400 comprises one or more fans or fan trays 418 and a cooling subsystem controller or controllers 417 that monitors thermal temperature(s) of the system 400 (or components thereof) and operates the fans/fan trays 418 to help regulate the temperature.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for segmenting latent representations comprising:
    given a variational autoencoder (VAE) model comprising an attention layer, a semantic encoder, a syntax encoder, and a decoder:
        generating, using an embedding layer, a sequence of embeddings for a sequence of tokens, in which the tokens are words or representations of words;
        generating, using the attention layer, a sequence of attention masks based on the sequence of embeddings;
        generating a sequence of hidden variables based on the sequence of embeddings and the sequence of attention masks;
        generating, using the semantic encoder, a first sequence of latent variables based on the sequence of hidden variables;
        generating, using the syntax encoder, a second sequence of latent variables based on the sequence of hidden variables;
        inferring, using the decoder, a sequence of reconstructed tokens and a sequence of reconstructed attention masks using at least information of the first sequence of latent variables from the semantic encoder and the second sequence of latent variables from the syntax encoder; and
        using the sequence of reconstructed tokens and the sequence of reconstructed attention masks to train at least the attention layer, the semantic encoder, the syntax encoder, and the decoder of the VAE model.

2. The computer-implemented method of claim 1 wherein each hidden variable in the sequence of hidden variables is generated by an element-wise multiplication between an embedding of the sequence of embeddings and a corresponding attention mask or masks of the sequence of attention masks.

3. The computer-implemented method of claim 1 wherein inferring a sequence of reconstructed tokens and a sequence of reconstructed attention masks based on at least information of at least the first and second sequences of latent variables comprising:
    combining a sequence of global latent variables with the first sequence of latent variables and the second sequence of latent variables to generate a first sequence of combined latent variables and a second sequence of combined latent variables respectively;
    receiving, at the decoder, the first sequence of combined latent variables and the second sequence of combined latent variables; and
    inferring the sequence of reconstructed tokens and the sequence of reconstructed attention masks.

4. The computer-implemented method of claim 1 further comprising:
    using the first sequence of latent variables, the second sequence of latent variables, or both to gauge semantics similarity of input words or representations of words, to gauge syntactic similarity of input words or representations of words, or for a natural language processing method.

5. The computer-implemented method of claim 4 wherein the step of using the sequence of reconstructed tokens and the sequence of reconstructed attention masks to train at least the attention layer, the semantic encoder, the syntax encoder, and the decoder comprises determining a loss comprises one or more total correlation (TC) terms to enforce disentanglement of latent variables.

6. The computer-implemented method of claim 5 wherein the one or more TC terms comprise a first Kullback-Leibler (KL) divergence for the semantic encoder and a second KL divergence for the syntax encoder.

7. The computer-implemented method of claim 6 wherein the first KL divergence is a KL divergence between a distribution of a first sequence of combined latent variables and a product of a factorial distribution for each latent variable in the first sequence of latent variables and a factorial distribution for each global latent variable in the first sequence of combined latent variables, and the second KL divergence is a KL divergence between a distribution of a second sequence of combined latent variables and a product of a factorial distribution for each latent variable in the second sequence of latent variables and a factorial distribution for each global latent variable in the second sequence of combined latent variables.

8. The computer-implemented method of claim 1 further comprising:
    for an input word or an input representation of a word that was input into a system comprising at least a trained attention layer, a trained semantic encoder, and a trained syntax encoder, using a combination of its corresponding first latent variable from the trained semantic encoder and its corresponding second latent variable from the trained syntax encoder.

9. A system for segmenting latent representations comprising:
    one or more processors; and
    a non-transitory computer-readable medium or media comprising one or more sets of instructions which, when executed by at least one of the one or more processors, causes steps to be performed comprising:

given a variational autoencoder (VAE) model comprising a semantic encoder, a syntax encoder, and a decoder:
    generating a sequence of embeddings for a sequence of tokens, in which a token is a word or a representation of a word;
    generating a sequence of attention masks based on the sequence of embeddings;
    generating a sequence of hidden variables based on the sequence of embeddings with the sequence of attention masks;
    generating, using the semantic encoder, a first sequence of latent variables based on the sequence of hidden variables;
    generating, using the syntax encoder, a second sequence of latent variables based on the sequence of hidden variables;
    inferring, using the decoder, a sequence of reconstructed tokens and a sequence of reconstructed attention masks using at least information of the first sequence of latent variables from the semantic encoder and the second sequence of latent variables from the syntax encoder; and
    using the sequence of reconstructed tokens and the sequence of reconstructed attention masks to train at least the semantic encoder, the syntax encoder, and the decoder of the VAE model.

10. The system of claim 9 wherein each hidden variable in the sequence of hidden variables is generated by an element-wise multiplication between an embedding of the sequence of embeddings and a corresponding attention mask or masks of the sequence of attention masks.

11. The system of claim 9 wherein inferring a sequence of reconstructed tokens and a sequence of reconstructed attention masks based on at least information of at least the first and second sequences of latent variables comprises steps of:
    combining a sequence of global latent variables with the first sequence of latent variables and the second sequence of latent variables to generate a first sequence of combined latent variables and a second sequence of combined latent variables respectively;
    receiving, at the decoder, the first sequence of combined latent variables and the second sequence of combined latent variables; and
    inferring the sequence of reconstructed tokens and the sequence of reconstructed attention masks.

12. The system of claim 9 wherein the non-transitory computer-readable medium or media further comprises one or more sets of instructions which, when executed by at least one of the one or more processors, causes steps to be performed comprising:
    using the first sequence of latent variables, the second sequence of latent variables, or both to gauge semantics similarity of input words or representations of words, to gauge syntactic similarity of input words or representations of words, or for a natural language processing method.

13. The system of claim 9 wherein the step of using the sequence of reconstructed tokens and the sequence of reconstructed attention masks to train at least an attention layer, the semantic encoder, the syntax encoder, and the decoder comprises determining a loss comprises a total correlation (TC) terms to enforce disentanglement of latent variables, and one or more TC terms comprise a first Kullback-Leibler (KL) divergence for the semantic encoder and a second KL divergence for the syntax encoder.

14. The system of claim 13 wherein the first KL divergence is a KL divergence between a distribution of a first sequence of combined latent variables and a product of a factorial distribution for each latent variable in a first sequence of latent variables and a factorial distribution for each global latent variable in the first sequence of combined latent variables, and the second KL divergence is a KL divergence between a distribution of a second sequence of combined latent variables and a product of a factorial distribution for each latent variable in the second sequence of latent variables and a factorial distribution for each global latent variable in the second sequence of combined latent variables.

15. A non-transitory computer-readable medium or media comprising one or more sequences of instructions which, when executed by at least one processor, causes steps for segmenting latent representations comprising:
    given a variational autoencoder (VAE) model comprising an attention layer, a semantic encoder, a syntax encoder, and a decoder:
        generating, using an embedding layer, a sequence of embeddings for a sequence of tokens, in which a token is a word or a representation of a word;
        generating, using the attention layer, a sequence of attention masks based on the sequence of embeddings;
        generating a sequence of hidden variables based on the sequence of embeddings with the sequence of attention masks;
        generating, using the semantic encoder, a first sequence of latent variables based on the sequence of hidden variables;
        generating, using the syntax encoder, a second sequence of latent variables based on the sequence of hidden variables;
        inferring, using the decoder, a sequence of reconstructed tokens and a sequence of reconstructed attention masks using at least information of the first sequence of latent variables from the semantic encoder and the second sequence of latent variables from the syntax encoder; and
        using the sequence of reconstructed tokens and the sequence of reconstructed attention masks to train at least the attention layer, the semantic encoder, the syntax encoder, and the decoder of the VAE model.

16. The non-transitory computer-readable medium or media of claim 15 wherein each hidden variable in the sequence of hidden variables is generated by an element-wise multiplication between an embedding of the sequence of embeddings and a corresponding attention mask or masks of the sequence of attention masks.

17. The non-transitory computer-readable medium or media of claim 15 wherein inferring a sequence of reconstructed tokens and a sequence of reconstructed attention masks based on at least information of at least the first and second sequences of latent variables comprises steps of:
    combining a sequence of global latent variables with the first sequence of latent variables and the second sequence of latent variables to generate a first sequence of combined latent variables and a second sequence of combined latent variables respectively;
    receiving, at the decoder, the first sequence of combined latent variables and the second sequence of combined latent variables; and
    inferring the sequence of reconstructed tokens and the sequence of reconstructed attention masks.

18. The non-transitory computer-readable medium or media of claim 15 further comprising one or more sequences of instructions which, when executed by at least one processor, causes steps to be performed comprising:

using the first sequence of latent variables, the second sequence of latent variables, or both to gauge semantics similarity of input words or representations of words, to gauge syntactic similarity of input words or representations of words, or for a natural language processing method.

19. The non-transitory computer-readable medium or media of claim 15 wherein the step of using the sequence of reconstructed tokens and the sequence of reconstructed attention masks to train at least the attention layer, the semantic encoder, the syntax encoder, and the decoder comprises determining a loss comprises a total correlation (TC) terms to enforce disentanglement of latent variables, and one or more TC terms comprise a first Kullback-Leibler (KL) divergence for the semantic encoder and a second KL divergence for the syntax encoder.

20. The non-transitory computer-readable medium or media of claim 19 wherein the first KL divergence is a KL divergence between a distribution of a first sequence of combined latent variables and a product of a factorial distribution for each latent variable in the first sequence of latent variables and a factorial distribution for each global latent variable in the first sequence of combined latent variables, and the second KL divergence is a KL divergence between a distribution of a second sequence of combined latent variables and a product of a factorial distribution for each latent variable in the second sequence of latent variables and a factorial distribution for each global latent variable in the second sequence of combined latent variables.

* * * * *